(12) United States Patent
Antinori et al.

(10) Patent No.: US 11,886,381 B2
(45) Date of Patent: Jan. 30, 2024

(54) META-FORMAT AND TECHNIQUE TO PRODUCE TUTORIALS FOR MULTIPLE PUBLISHING FORMATS

(71) Applicant: Red Hat, Inc., Raleigh, NC (US)

(72) Inventors: Paolo Antinori, Milan (IT); Brian Fitzpatrick, Denver, CO (US)

(73) Assignee: Red Hat, Inc., Raleigh, NC (US)

( * ) Notice: Subject to any disclaimer, the term of this patent is extended or adjusted under 35 U.S.C. 154(b) by 60 days.

(21) Appl. No.: 17/360,273

(22) Filed: Jun. 28, 2021

(65) Prior Publication Data

US 2022/0414056 A1    Dec. 29, 2022

(51) Int. Cl.
*G06F 16/00* (2019.01)
*G06F 16/11* (2019.01)
*G06F 16/16* (2019.01)
*G06F 16/13* (2019.01)

(52) U.S. Cl.
CPC .......... *G06F 16/116* (2019.01); *G06F 16/122* (2019.01); *G06F 16/13* (2019.01); *G06F 16/16* (2019.01)

(58) Field of Classification Search
CPC ...... G06F 16/116; G06F 16/122; G06F 16/16; G06F 16/13
See application file for complete search history.

(56) References Cited

U.S. PATENT DOCUMENTS

| | | | | |
|---|---|---|---|---|
| 6,055,525 A | * | 4/2000 | Nusbickel | G06F 16/258 |
| 6,901,403 B1 | * | 5/2005 | Bata | G06F 16/26 |
| 7,162,697 B2 | | 1/2007 | Markel | |
| 7,689,680 B1 | * | 3/2010 | Peterson | G06F 11/28 709/225 |
| 7,908,627 B2 | | 3/2011 | Ansari et al. | |
| 8,347,374 B2 | * | 1/2013 | Schneider | H04L 63/0884 726/12 |

(Continued)

FOREIGN PATENT DOCUMENTS

| | | | |
|---|---|---|---|
| EP | 2374291 B1 | | 1/2014 |
| WO | WO2018098424 | * | 5/2018 |
| WO | WO2018098424 A1 | * | 5/2018 |

OTHER PUBLICATIONS

Red Hat Developer, Blog Articles, Click-through learning with VS Code and Didact, Brian Fitzpatrick, Jan. 31, 2020. 9 Pages.

(Continued)

*Primary Examiner* — Daniel A Kuddus
(74) *Attorney, Agent, or Firm* — K&L Gates LLP (57) ABSTRACT

The present disclosure provides new and innovative systems and methods for publishing standardized data in a variety of formats. In an example, a computer-implemented method includes obtaining source data, wherein the source data is in a standardized format, obtaining target platform data comprising a target platform address and a target format, generating a directory structure based on the source data and the target format, generating target data based on the source data and the target format, wherein the target data is in the target format, packaging the target data in the directory structure, generating instructions based on the target platform data and the packaged data, and transmitting the packaged data and the instructions to a third-party server system identified by the target platform address.

20 Claims, 6 Drawing Sheets

(56) References Cited

U.S. PATENT DOCUMENTS

| | | | |
|---|---|---|---|
| 8,990,813 B2* | 3/2015 | Frields | G06F 9/45533 717/124 |
| 9,317,496 B2 | 4/2016 | Myers et al. | |
| 9,699,265 B2 | 7/2017 | Sahota et al. | |
| 2002/0156702 A1* | 10/2002 | Kane | G06Q 30/0641 705/27.1 |
| 2004/0098306 A1* | 5/2004 | Fitzpatrick | G06Q 30/0226 705/14.27 |
| 2005/0131970 A1* | 6/2005 | Salazar | G06F 16/258 |
| 2007/0294560 A1* | 12/2007 | Muthukumarasamy | G06F 11/2635 714/2 |
| 2010/0161729 A1* | 6/2010 | Leblanc | H04L 67/565 709/224 |
| 2014/0189500 A1* | 7/2014 | Sahota | G06F 16/958 715/239 |
| 2017/0003987 A1* | 1/2017 | Bordeau | G06F 9/44521 |
| 2018/0150528 A1* | 5/2018 | Shah | G06F 16/254 |
| 2018/0246886 A1* | 8/2018 | Dragomirescu | G06F 16/2379 |

OTHER PUBLICATIONS

Zapier; How to automatically convert Markdown to HTML, Matthew Guay, Feb. 25, 2021, 6 pages.

* cited by examiner

META-FORMAT AND TECHNIQUE TO PRODUCE TUTORIALS FOR MULTIPLE PUBLISHING FORMATS

BACKGROUND

Markup languages can be used to format documents for display. For example, web browsers can receive hypertext markup language (HTML) documents and render the HTML documents into web pages. The HTML describes the structure of the web page and is used to format the text in the HTML document.

SUMMARY

The present disclosure relates generally to digital data structures and more specifically to the processing and management of documents in multiple formats for publication. The present disclosure provides new and innovative systems and methods for publishing standardized data in a variety of formats. In an example, a computer-implemented method includes obtaining source data, which is in a standardized format, obtaining target platform data including a target platform address and a target format, generating a directory structure based on the source data and the target format, generating target data, which is in the target format, based on the source data and the target format, packaging the target data in the directory structure, generating instructions based on the target platform data and the packaged data, and transmitting the packaged data and the instructions to a third-party server system identified by the target platform address.

In an example, a computer-implemented method includes obtaining source data in a standardized format, obtaining target platform data including a target format for a plurality of third-party server systems, generating, for each third-party server system in the plurality of third-party server systems, target data in the target format based on the source data and the target format, generating instructions based on the target platform data and the target data, and transmitting, to each third-party server system in the plurality of third-party server systems, the target data and the instructions corresponding to the third-party server system.

In an example, an apparatus includes a processor and a memory in communication with the processor and storing instructions that, when executed by the processor, cause the apparatus to obtain source data in a standardized format, obtain first target platform data including a first target format for a first target server system, obtain second target platform data including a second target format for a second target server system, generate first target data based on the source data and the first target format, generate second target data based on the source data and the second target format, transmit the first target data to the first target server system, wherein the first server system provides the first target data via at least one web page, and transmit the second target data to the second target server system, wherein the second server system provides the second target data via an application executing on a computing device.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

The description will be more fully understood with reference to the following figures, which are presented as exemplary aspects of the disclosure and should not be construed as a complete recitation of the scope of the disclosure, wherein.

DETAILED DESCRIPTION

Turning now to the drawings, techniques are disclosed for new and innovative systems and methods for publishing standardized data in a variety of target formats. Several content platforms for providing interactive documentation and tutorials have emerged in recent years, such as Katacoda and Instruqt. These content platforms enable developers to define interactive tutorials to guide users to better product understanding while also solving their problems along the way. Many of these environments include scenarios pre-built with backend systems ready for them to develop, run, and debug entire applications without needing anything more than a web browser and an internet connection. A variety of other platforms, such as GitHub's Learning Lab, Magic Sandbox from MSB, and the Didact framework for a variety of integrated development environments (IDE), such as VS Code. Each content platform has its own demands on content creation and formatting that limit migrating content across different content platforms. This has the downside of locking content developers into a single platform.

The techniques described herein provide a system-agnostic platform for defining source content in a standardized format that can easily be translated into a variety of output formats depending on the target content platform on which the content is to be published. The source content can include text information providing the desired instructional content and a variety of markup components that provide semantic meaning to the text information. Each target platform can have its own target platform format that defines the markup components, file structure, directory structure, file and/or content indices, and any other data utilized in the creation of content for the target platform. The source content can be translated from the standard format into the target platform format. In a variety of aspects, the translation can be tested and/or verified to ensure that the conversion of the source content from the standard format to the target format is correct and conforms to the requirements of the target platform. Additionally, instructions can be generated that cause the target platform to receive, process, and/or publish the content. The translated content and/or the instructions can be provided to the target platform, which then hosts the content.

The techniques described herein provide a specific improvement over prior art systems by allowing the sharing of information in a standardized format regardless of the format in which the information is to be provided to an end user. Additionally, the techniques described herein improve the functioning of computer-related technology by allowing computing devices to automatically generate and process data in a standardized format into a variety of target formats for publishing, thereby improving the ability of the computing device to automatically provide data in a standardized format across multiple platforms having incompatible target formats.

A variety of systems and methods in accordance with aspects of the disclosure are described in more detail below.

Computing Systems

Figure 1:
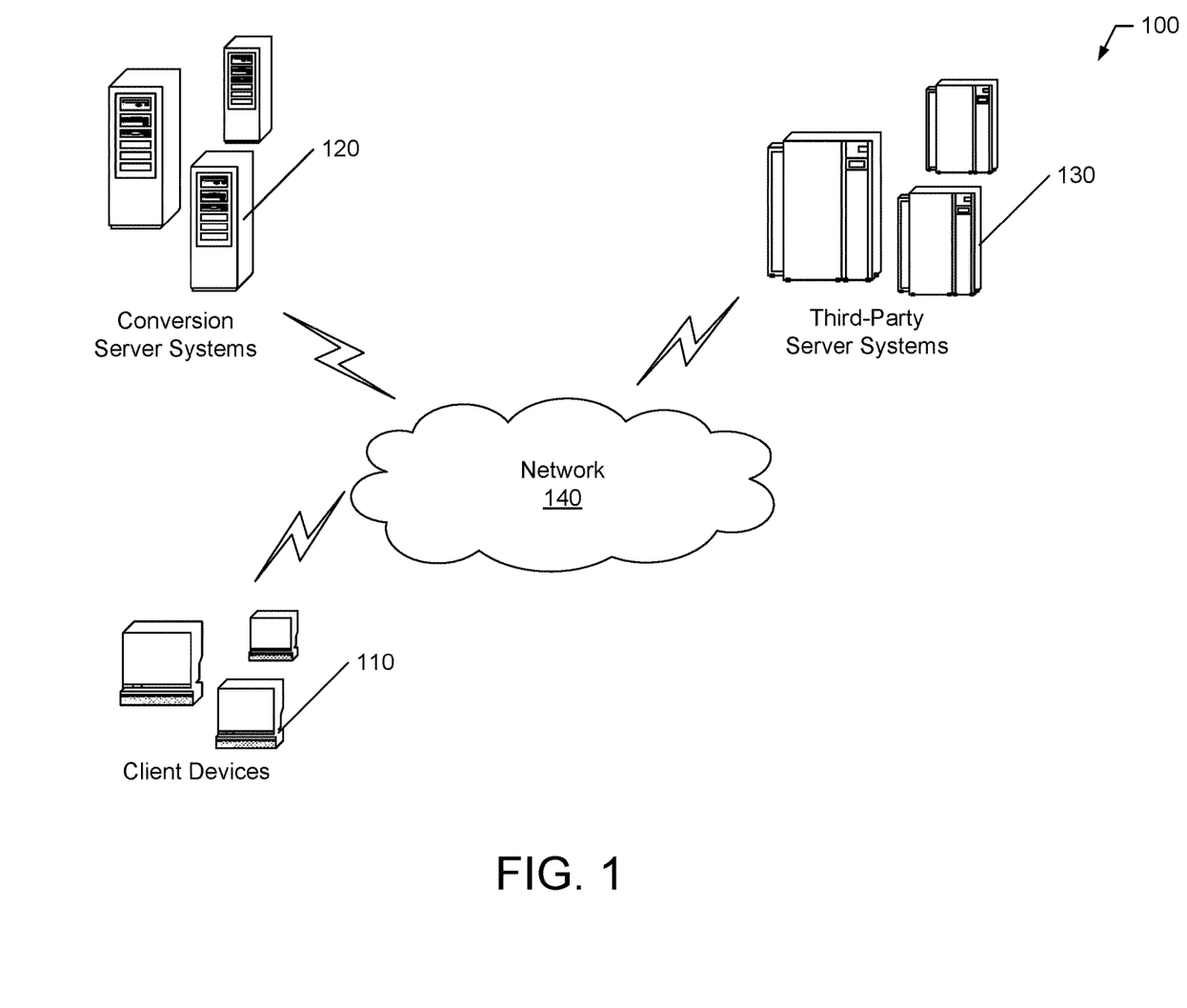
FIG. 1 illustrates a block diagram of an example computing system according to an example aspect of the present disclosure.

FIG. 1 depicts a high-level component diagram of an example computing system 100 in accordance with one or more aspects of the present disclosure. The computing system 100 can include client devices 110, conversion server systems 120, and third-party server systems 130 in communication via network 140. In many aspects, the conversion server systems 120 and/or third-party server systems 130 are implemented using a single server. In a variety of aspects, the conversion server systems 120 and/or third-party server systems 130 are implemented using a plurality of servers. In several aspects, client devices 110 are implemented utilizing the conversion server systems 120 and/or third-party server systems 130. In a variety of aspects, conversion server system 120 and/or third-party server system is implemented using the client device 110.

Client devices 110 can generate source data. The source data can include a variety of information (e.g. text data) and markup controlling the intended display of the information as described herein, including with respect to FIG. 2. Conversion server system 120 can obtain source data and target platform data and generate target data based on the source data and the target platform data. In many aspects, the client device 110 and/or third-party server system 130 provides the target platform data to the conversion server system 120. The target platform data can indicate the format and/or contents of the target data for processing and display by a target system, such as a third-party server system 130. In many aspects, the target system includes a target platform provided by the third-party server system 130. A target platform can include, but is not limited to, a website providing one or more web pages or a service providing one or more application programming interfaces (APIs) that provide data on request, on demand, automatically, on a schedule, or any other interval. However, it should be noted that any target system, such as client devices 110, can be used. The conversion server system 120 can also generate instructions that cause the target system to process and/or provide the target data. Third-party server system 130 can obtain the target data and/or instructions and provide the target data to one or more computing devices as described herein.

Any of the computing devices shown in FIG. 1 (e.g. client devices 110, conversion server systems 120, and third-party server systems 130) can include a single computing device, multiple computing devices, a cluster of computing devices, and the like. A computing device can include one or more physical processors communicatively coupled to memory devices, input/output devices, and the like. As used herein, a processor may also be referred to as a central processing unit (CPU). Additionally, as used herein, a processor can include one or more devices capable of executing instructions encoding arithmetic, logical, and/or I/O operations. In one illustrative example, a processor may implement a Von Neumann architectural model and may include an arithmetic logic unit (ALU), a control unit, and a plurality of registers. In many aspects, a processor may be a single core processor that is typically capable of executing one instruction at a time (or process a single pipeline of instructions) and/or a multi-core processor that may simultaneously execute multiple instructions. In a variety of aspects, a processor may be implemented as a single integrated circuit, two or more integrated circuits, and/or may be a component of a multi-chip module in which individual microprocessor dies are included in a single integrated circuit package and hence share a single socket. As discussed herein, a memory refers to a volatile or non-volatile memory device, such as RAM, ROM, EEPROM, or any other device capable of storing data. Input/output devices can include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. In several aspects, a computing device provides an interface, such as an API or web service, which provides some or all of the data to other computing devices for further processing. Access to the interface can be open and/or secured using any of a variety of techniques, such as by using client authorization keys, as appropriate to the requirements of specific applications of the disclosure.

The network 140 can include a LAN (local area network), a WAN (wide area network), telephone network (e.g. Public Switched Telephone Network (PSTN)), Session Initiation Protocol (SIP) network, wireless network, point-to-point network, star network, token ring network, hub network, wireless networks (including protocols such as EDGE, 3G, 4G LTE, Wi-Fi, 5G, WiMAX, and the like), the Internet, and the like. A variety of authorization and authentication techniques, such as username/password, Open Authorization (OAuth), Kerberos, SecureID, digital certificates, and more, may be used to secure the communications. It will be appreciated that the network connections shown in the example computing system 100 are illustrative, and any means of establishing one or more communications links between the computing devices may be used.

Document Formats

A standard format for a document can include a variety of formatting markup that can be used by a computing device to display the document in a certain format. Defining documents in a standard format simplifies the generation, processing, and storage of the documents. Processing the documents can include converting the standard format into a specific target format for a particular target system. In this way, documents generated in the standard format can be deployed to a variety of target systems, each having its own format.

Figure 2:
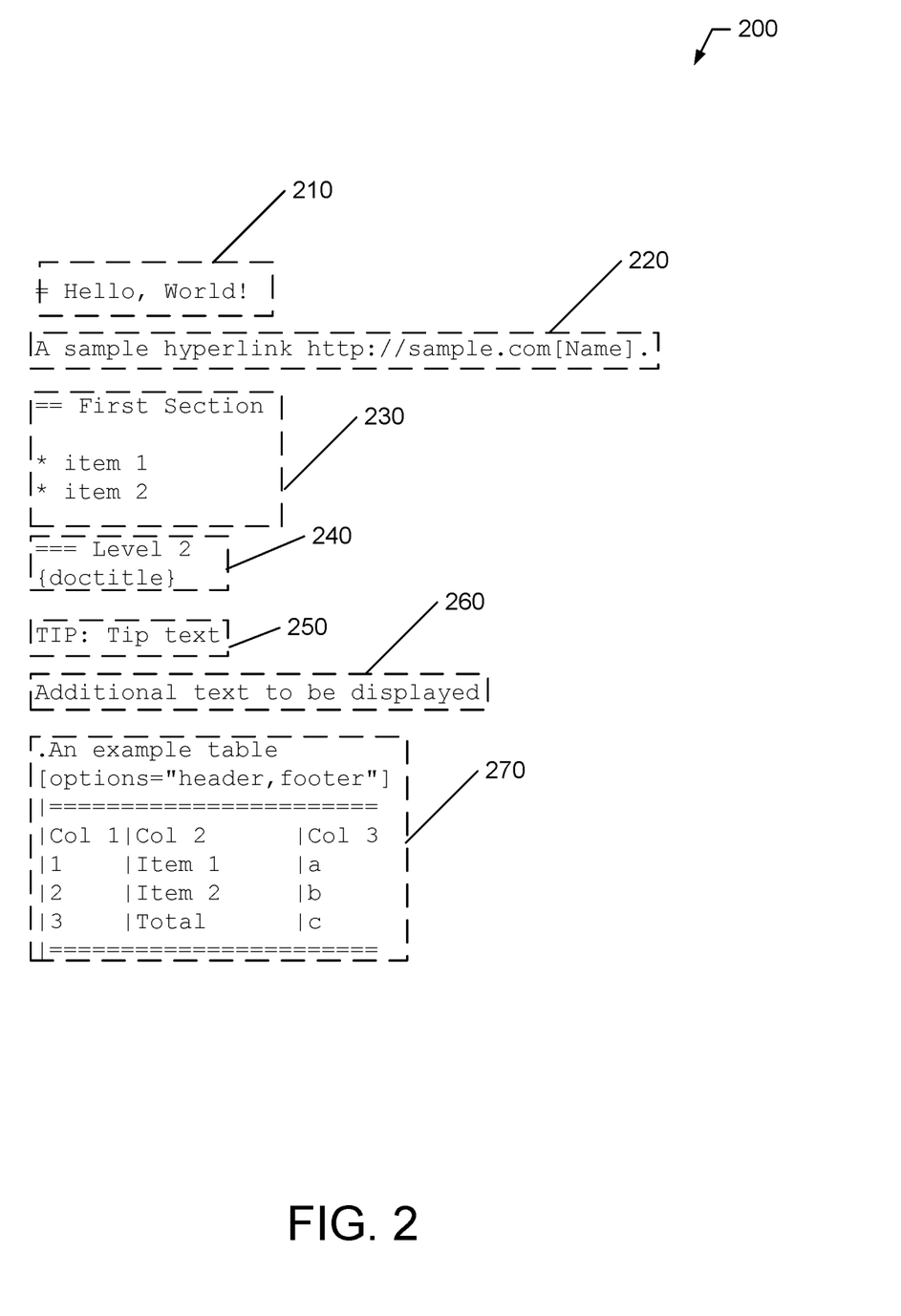
FIG. 2 illustrates an example of a document in a standard format according to an example aspect of the present disclosure.

FIG. 2 illustrates an example of a document in a standard format according to an example aspect of the present disclosure. The sample document 200 includes a variety of elements, including a title element 210, a hyperlink element 220, a first text element 230, a second text element 240, pre-formatted text element 250, plain text element 260, and table element 270. It should be noted that these elements are shown for illustrative purposes only and should not be considered limiting on any particular source document in accordance with aspects of the disclosure.

Title element 210 includes markup including a title operator '=' along with the associated text "Hello, World!" When this markup is interpreted and rendered, it can result in an output of the "Hello, World!" text in a title style, such as in particular font and with a headline displayed under the text. In a variety of aspects, the title operator associates the text with a document variable that can referenced later. For example, the '=' markup operator can be associated with the {doctitle} variable, and in sample document 200 the value of {doctitle} can be set to "Hello, World!" It should be noted that any markup operator can be associated with any variable, array, or other data structure holding a value corresponding to the markup operator. These variables can be used to reference the assigned values at any point within the document.

Hyperlink element 220 includes text "A sample hyperlink," a uniform resource locator (URL) "http://sample.com," and a URL title "Name." When rendered, the markup causes hyperlink element 220 to be rendered as "A sample hyperlink Name" where "Name" is a hyperlink that navigates to "http://sample.com."

First text element 230 has the markup "==" and the text "First Section" along with "item 1" and "item 2" marked with the "*" markup. Rendering first text element 230 can result in an output of the "First Section" text in a section style, such as in a 24-point font and red text. The "item 1" and "item 2" can be displayed in a bulleted list. Second text element 240 has the markup "===" and the text "Level 2" along with the {doctitle} variable. Rendering second text element 240 can result in an output of the "Level 2" text in a secondary section style, such as in a 20-point font and bolded. The {doctitle} variable can cause the output to include the text "Hello, World!" as defined in title element 210. Pre-formatted text element 250 includes the markup "TIP:" and the text "Tip text." The "TIP:" markup can cause the "Tip text" to be displayed next to a tip graphical icon and in a gray box with a black border. Plain text element 260 includes the text "Additional text to be displayed" without any associated markup. In rendering the sample document 200, the text "Additional text to be display" can be rendered in the standard font and at the standard size for the document without any additional formatting.

Table element 270 includes the text ".An example table" with control markup "[options="header,footer"]," a table start indicator "|===================" a header row "|Col 1|Col 2|Col 3," a first row "|1|Item 1|a," a second row "|2|Item 2|b," a footer row "|3|Total|c," and a table end indicator "|===================" The text ".An example table" starting with the markup "." indicates a comment and this text is not displayed when the sample document 200 is rendered. The control markup indicates one or more options for the table, and in this example the "header,footer" options cause the first row of the table (e.g. "Col 1|Col 2|Col 3" to be shown as a header for the table and the last row of the table (e.g. ""|3|Total|c") to be shown as a footer for the table. The first row "|1|Item 1|a" and the second row "|2|Item 2|b" are rendered as internal rows to the table. For example, the table element 270 could be rendered as:

| Col 1 | Col 2  | Col 3 |
|-------|--------|-------|
| 1     | Item 1 | a     |
| 2     | Item 2 | b     |
| 3     | Total  | c     |

It should be noted that a variety of markup languages can be utilized as the standard format for a document. In many aspects, the standard format includes the AsciiDoc markup language. However, any of a variety of markup languages, such as HTML, XML, Markdown, Markdown Extra, BBCode, Gemtext, GitHub Flavored Markdown, Jira Formatting Notation, MediaWiki, Org-mode, PmWiki, reStructuredText, Slack, Textile, and the like, can be used as appropriate.

Although a variety of different document formats and formatting codes are shown with respect to source data 200, it should be noted that source data 200 is provided by way of example only and any document formats, formatting codes, and/or text, including document formats and formatting codes not listed herein, can be included in source data in accordance with aspects of the disclosure.

Generating and Publishing Target Data

Source data in accordance with aspects of the disclosure can be maintained in an easily maintained, standardized format that includes a variety of markup attributes that provide semantic meaning regarding the intended visualization of the source data. The source data can be converted to a target format for a particular target platform by converting elements of the source data, expressed in the standard markup attributes, to elements expressed using the markup attributes defined in the target format. In several aspects, the conversion of the source data can include generating deployment instructions for the target platform, which cause the target platform to obtain, process, and/or publish the content. In this way, the target platforms can automatically provide the content to a variety of users.

Figure 3:
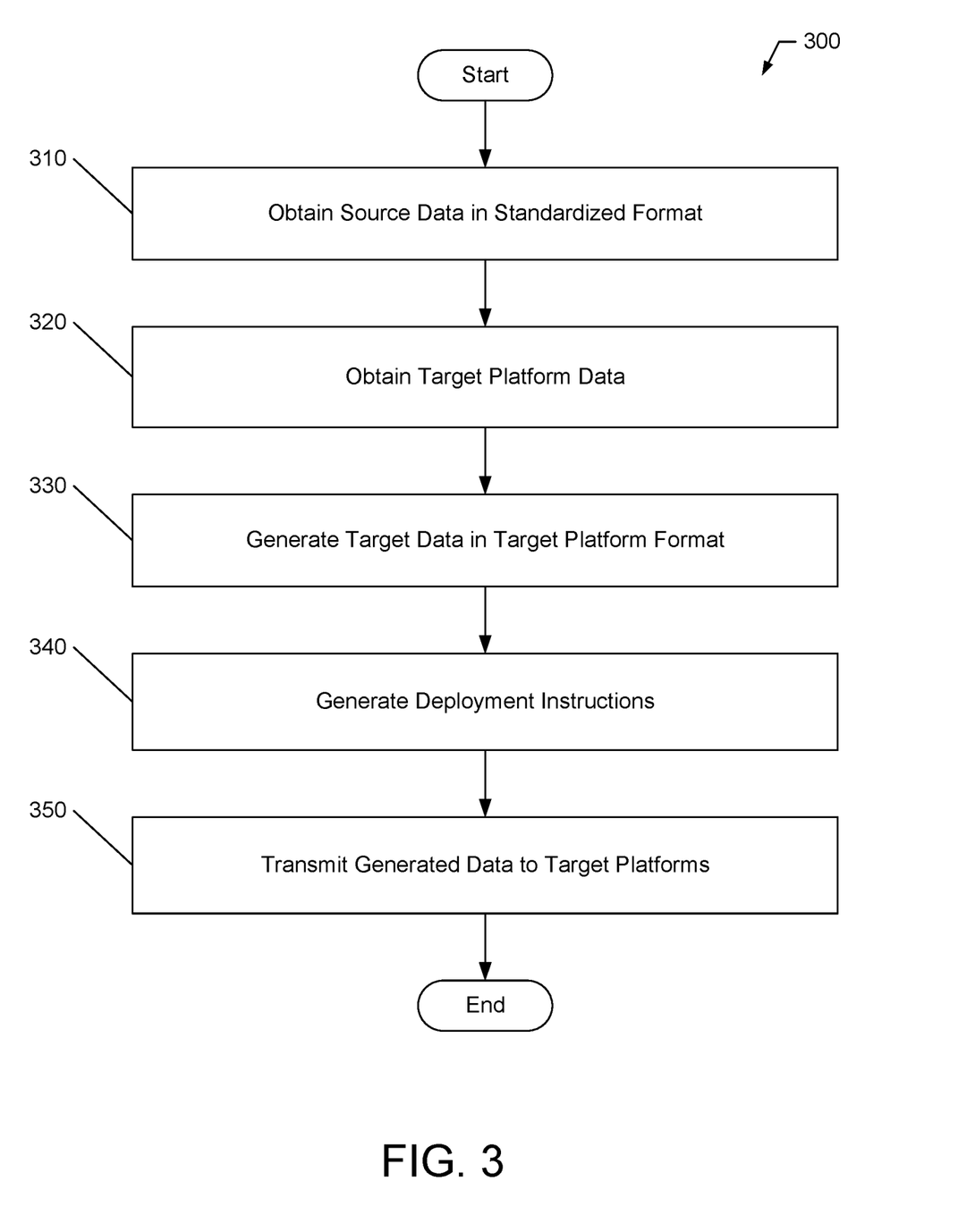
FIG. 3 illustrates a flowchart of an example process for generating documents in target formats according to an example aspect of the present disclosure.

FIG. 3 illustrates a flowchart of an example process for generating documents in target formats according to an example aspect of the present disclosure. Although the example process 300 is described with reference to the flowchart illustrated in FIG. 3, it will be appreciated that many other methods of performing the acts associated with the method 300 may be used. For example, the order of some of the blocks may be changed, certain blocks may be combined with other blocks, one or more blocks may be repeated, and some of the blocks described are optional. The method 300 may be performed by processing logic that may include hardware (circuitry, dedicated logic, etc.), software, or a combination of both.

The example process 300 includes obtaining source data in a standardized format (block 310). The source data can include text information (e.g. the content to be provided to a user) and markup indicating the formatting of the text information when the source data is rendered for output such as, but not limited to, display via a web browser. The standardized format can define the markup and/or the organization of the files in the source data. In a variety of aspects, the source data is a single file. In several aspects, the source data includes several files. These files can include multiple text files, audio data, image data, video data, linkbases (e.g. files that provide references to other files and/or computing devices), definition files (e.g. files that define one or more variables that can be used in other files), and/or any other files as appropriate.

Target platform data can be obtained (block 320). The target platform data can describe a target format for a particular target platform. The target format can define the markup and/or the organization of the files in target data for the target platform. The markup language requirements defined in the target format are typically different from and/or incompatible with the standard format. The target platform data can also include one or more indicators of application programming interfaces (APIs) provided by the target platform.

Target data can be generated in a target platform format (block 330). The target data can be generated by automatically converting the source data into the target format. In many aspects, converting the source data includes transforming elements in the source data from the standard format to corresponding elements in the target format as defined in the target platform data. For example, converting from the source format to the target format can include identifying a title for the source data by locating title markup within the source data. The text associated with this title element can be used to generate a first-level heading element in the target format. In several aspects, description markup can be identified in the source document and that description element can be mapped to a second-level heading element in the target format. The text data from the source data can be copied into the corresponding elements created based on the markup for the text data. For example, assume a title element is defined using the '=' markup and a descriptive heading is defined using the '==' markup in the source format and a first level heading is defined using the '#' markup and a second-level heading is defined using the "##" markup in the target format. In this example, converting the element "=Title" in the source format to a first-level heading element "#Title" in the target format. Similarly, the "== Heading" element in the source data can be converted into a "##Heading" second-level heading element in the target format.

While processing the source data, any commands and/or variables can be identified and transformed into corresponding commands and/or variables in the target data. In a number of aspects, the target format may not define commands and/or variables that correspond to the elements in the source data. For example, the target format may not support variables. In several aspects, the value of the variable can be determined for the source data and that value, rather than a variable, can be directly inserted into the corresponding elements in the target data. In many aspects, command elements (or any other directives) in the source data without a corresponding command in the target format can be automatically performed and the results of performing the command in the source data can be inserted as the corresponding element in the target data.

Deployment instructions can be generated (block 340). The deployment instructions can include any computer-readable instructions that cause the target platform to perform actions defined in the deployment instructions. In a variety of aspects, the deployment instructions cause the target platform to receive the target data and store the target data in a database maintained by the target platform. The deployment instructions can cause the target platform to publish the target data so that it can be accessed by a variety of computing devices. In several aspects, the deployment instructions can cause the target platform to publish one or more web pages including the data formatted according to the target format, resulting in a visual display of the data substantially corresponding to the intended formatting of the displayed source data in the source format. In a variety of aspects, the deployment instructions cause the target platform to provide one or more notifications (such as but not limited to push notifications and pop-up notifications) that can be displayed within an application executing on the target platform. The notifications can be associated with certain content, displayed via the application, which corresponds to particular elements within the target data.

The generated data can be transmitted to target platforms (block 350). The transmitted data can include the target data, the deployment instructions, and/or any other data as appropriate. In a number of aspects, transmitting the generated data includes transmitting the generated data via an API provided by the target platform in the target platform data. Transmitting the data can also cause the target platform to deploy the target data, either automatically and/or by executing the deployment instructions as appropriate. In many aspects, the generated data can be updated, such as when a new version of the source data becomes available and the target data can be automatically updated based on the updating of the source data. The updated generated data can be transmitted to the target platform and redeployed by the target platform.

Figure 4:
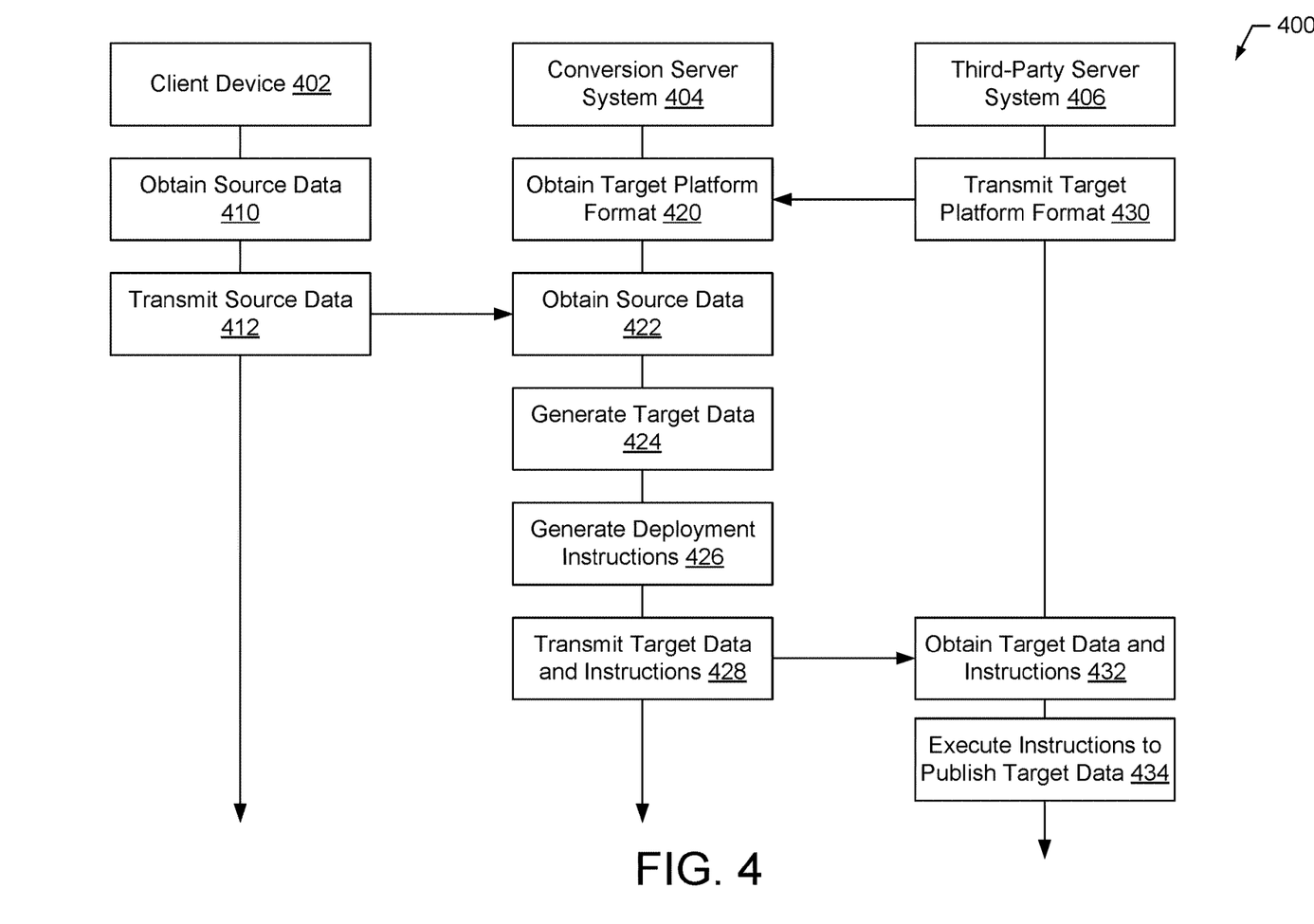
FIG. 4 illustrates a flow diagram of an example process for generating documents in target formats according to an example aspect of the present disclosure.

FIG. 4 illustrates a flow diagram of an example process for generating documents in target formats according to an example aspect of the present disclosure. Although the example process 400 is described with reference to the flowchart illustrated in FIG. 4, it will be appreciated that many other methods of performing the acts associated with the process 400 may be used. For example, the order of some of the blocks may be changed, certain blocks may be combined with other blocks, one or more blocks may be repeated, and some of the blocks described are optional. For example, the client device 402 may communicate with the third-party server system 406 to perform the example process 400.

In the illustrated example process 400, a third-party server system 406 can transmit target platform data to a conversion server system 404 at block 430. The target platform data can define a target format for data to be provide via a target platform provided by the third-party server system 406 as described herein. A conversion server system 404 can obtain the target platform data at block 420.

A client device 402 can obtain source data at block 410. For example, the source data can include information formatted using a standard format and generated by a user creating a tutorial or other documentation. The client device 402 can transmit the source data at block 412. The conversion server system 404 can obtain the source data at block 422.

The conversion server system 404 can generate target data at block 424. Generating the target data can include converting elements defined in the source data into corresponding elements defined in the target format as described herein. The conversion server system 404 can generate deployment instructions at block 426. The deployment instructions can cause the third-party server system 406 to provide the target data via a target platform provided by the third-party server system 406 as described herein. The conversion server system 404 can transmit the target data and the deployment instructions at block 428.

The third-party server system 406 can obtain the target data and deployment instructions at block 432. The third-party server system 406 can execute the deployment instructions to publish the target data at block 434. The target data can be published using a target platform provided by the third-party server system 406. Once published, the third-party server system can provide the target data to a variety of computing devices as described herein.

Figure 5:
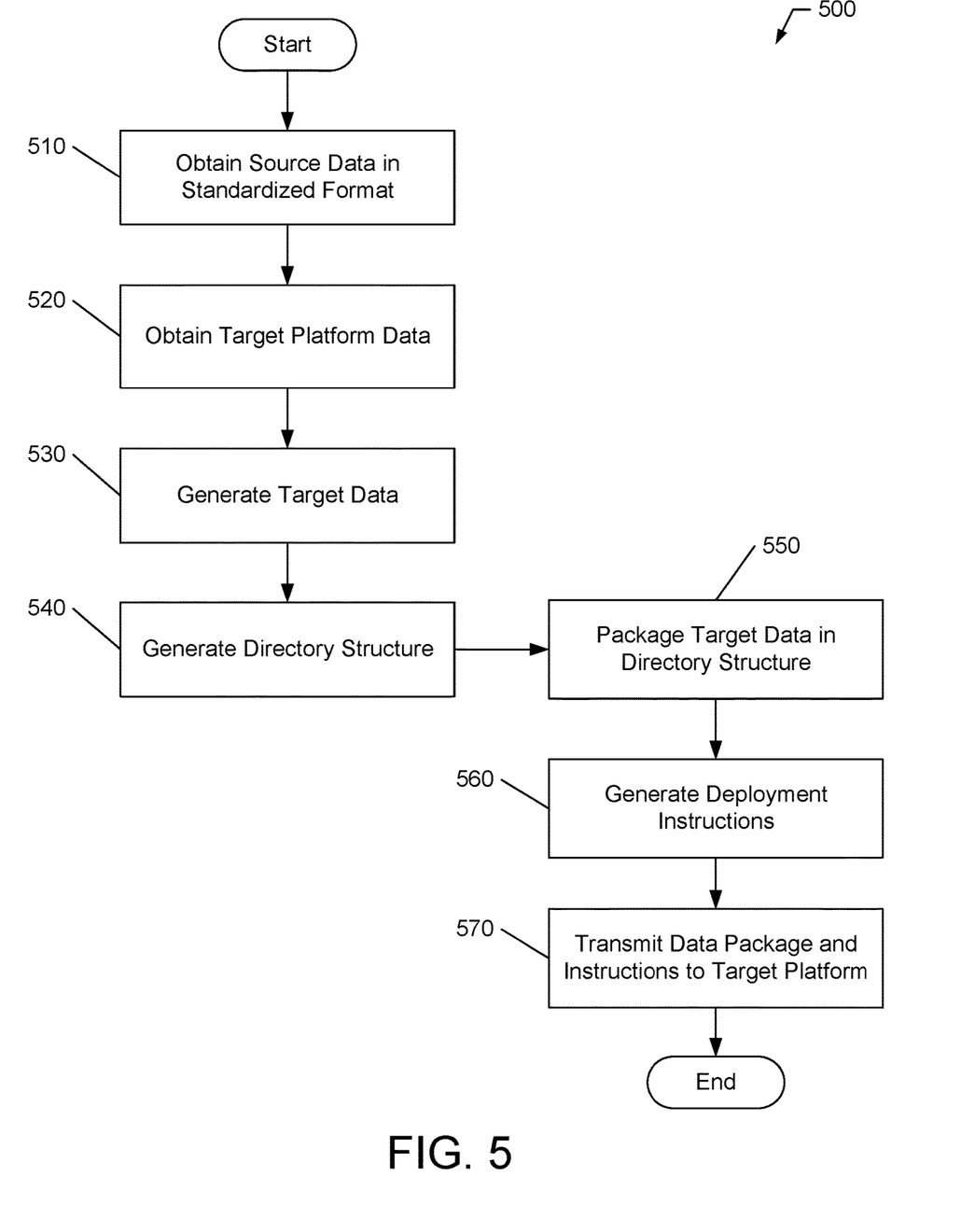
FIG. 5 illustrates a flowchart of an example process for generating documents in target formats having a specific directory structure according to an example aspect of the present disclosure.

In a variety of aspects, the target format defines, in addition to particular markup elements, a particular structure that the files that constitute the target data are to be arranged. Additionally, a variety of indexes can be defined and used in the target data to quickly identify and locate various files within the directory structure. FIG. 5 illustrates a flowchart of an example process for generating documents in target formats having a specific directory structure according to an example aspect of the present disclosure. Although the example process 500 is described with reference to the flowchart illustrated in FIG. 5, it will be appreciated that many other methods of performing the acts associated with the process 500 may be used. For example, the order of some of the blocks may be changed, certain blocks may be combined with other blocks, one or more blocks may be repeated, and some of the blocks described are optional. The process 500 may be performed by processing logic that may include hardware (circuitry, dedicated logic, etc.), software, or a combination of both.

The example process 500 includes obtaining source data in a standardized format (block 510). The source data can include text information (e.g. the content to be provided to a user) and markup indicating the formatting of the text information as described herein. The source data can include one or more files having a variety of data, such as text data, audio data, image data, video data, linkbases (e.g. files that provide references to other files and/or computing devices), definition files (e.g. files that define one or more variables that can be used in other files), and/or any other files as appropriate.

Target platform data can be obtained (block 520). The target platform data can describe a target format for a particular target platform and/or one or more APIs associated with the target platform as described herein. The target format can define the markup and/or the organization of the files in target data for the target platform as described herein. In many aspects, the target format includes a directory structure and/or an index structure used by the target platform to process, store, and/or publish data in the target format.

Target data can be generated (block 530). The target data can be generated by automatically converting elements in the source data into corresponding elements in the target format as described herein. In many aspects, converting the source data includes transforming elements in the source data from the standard format to corresponding elements in the target format as defined in the target platform data as described herein. In several aspects, the corresponding elements in the target format are located in different files within the target data. For example, each top-level heading element defined in the source data can be mapped to a different file in the target data. Elements within the source data falling under the top-level heading element can be converted into corresponding elements in the target format and stored in the file associated with its top-level heading element.

In a variety of aspects, an index can be generated indicating each file generated. The index file can also indicate the location of the files within a directory structure. In a variety of aspects, the index file defines the scenario title, the description, steps order, a user interface layout, environment, and/or any other features of the target data. Any of a variety of file formats, such as (but not limited to) the JavaScript Object Notation, can be used to structure the index file. Additionally, any other files (such as audio files, video files, image files, and the like) can be indicated in the index. The index file can also provide a navigable structure for the target data. For example, the index file can indicate an introductory file that should be provided first whenever the content is accessed along with a listing of the different files in the target data.

A directory structure can be generated (block 540). The directory structure can include a root folder and/or one or more subfolders. Each subfolder can have zero or more subfolders, such that the root directory and/or any subdirectories form a hierarchical organization of folders in which zero or more files can be stored. The directory structure can be generated based on the target format and/or the generated target data. In a number of aspects, the target format can define particular directories in which files will be stored in the target data and/or the location of the index file within the directory structure. In several aspects, the directory structured can be determined dynamically based on the files created in the generation of the target data. In this way, the directory structure can be based on the specific elements defined in the source data. In many aspects, the directory structure is partially defined in the target format and partially defined based on the elements present in the source data. In this way, the directory structure can have a known overall format with a portion dynamically defined based on the structure of the source data being converted.

The target data can be packaged in the directory structure (block 550). Packaging the target data into the directory structure can include storing one or more of the files in the target data into a corresponding directory within the directory structure. In several aspects, packaging the data can include storing the generated index in the root of the directory structure. In a number of aspects, the directory structure, files, and/or index can be stored using an archive file. Any of a variety of archive techniques, such as tape archives, tarball archives, ISO images, gzip archives, zip archives, 7zip archives, application packages such as APKs, cabinet archives, disk image archives, Java archives, and any other archive format can be used as appropriate.

Instructions can be generated (block 560). The deployment instructions can include any computer-readable instructions that cause the target platform to perform actions defined in the deployment instructions. In a variety of aspects, the deployment instructions cause the target platform to receive the target data and store the target data in accordance with the directory structure. The deployment instructions can cause the target platform to publish the target data for access by a variety of computing devices. In several aspects, the deployment instructions can cause the target platform to publish one or more web pages as organized by the index for the target data. In a variety of aspects, the deployment instructions cause the target platform to provide one or more notifications (such as but not limited to push notifications and pop-up notifications) that can be displayed within an application executing on the target platform as described herein.

The packaged data and/or instructions can be transmitted to the target platform (block 570). The transmitted data can include the packaged data, the deployment instructions, and/or any other data as appropriate. In a number of aspects, transmitting the generated data includes transmitting the generated data via an API provided by the target platform in the target platform data as described herein. Transmitting the data can also cause the target platform to deploy the target data, either automatically and/or by executing the deployment instructions as described herein. In several aspects, deploying the target data includes decompressing an archive file to extract the files and/or directory structure generated in accordance with the target platform data.

Figure 6:
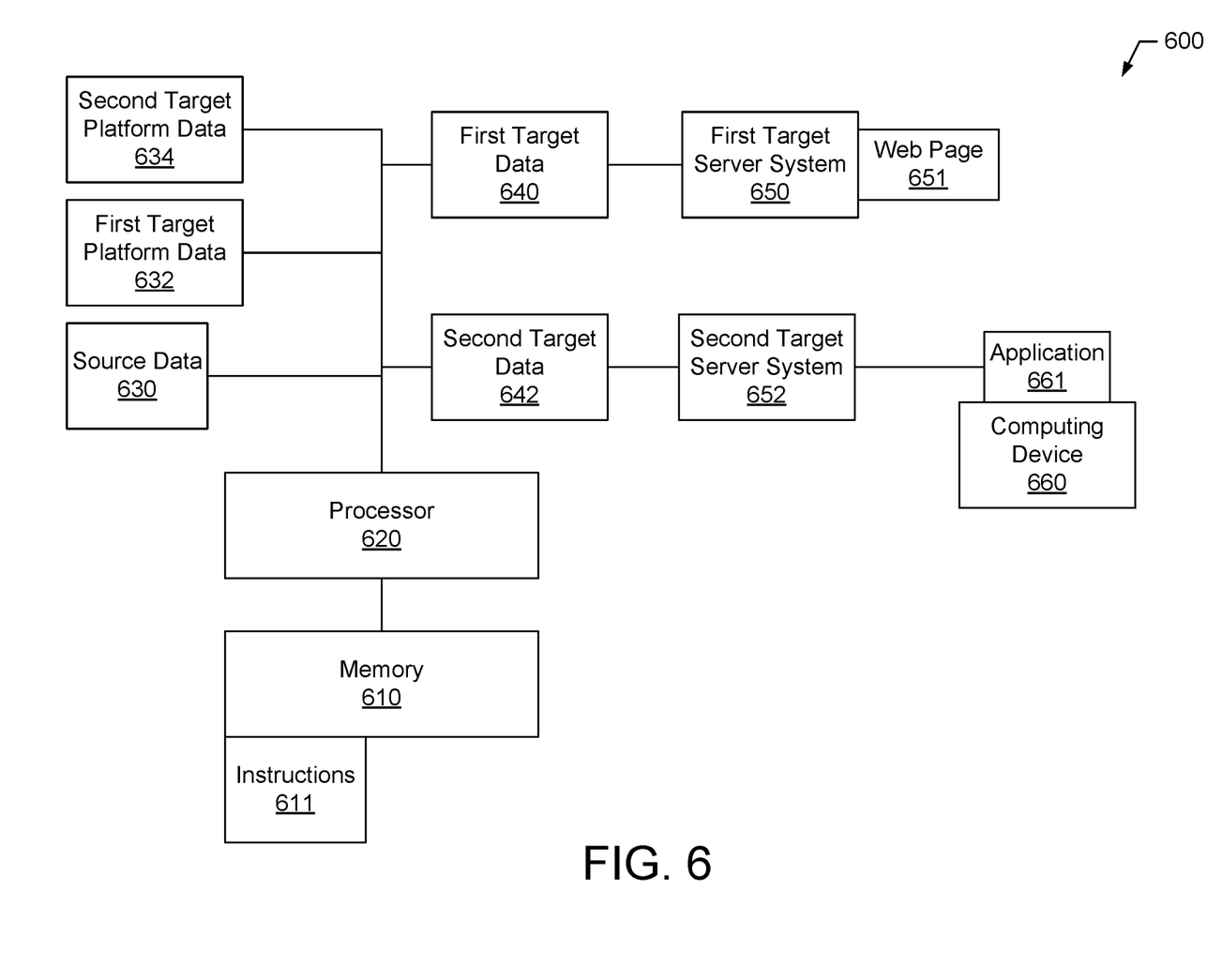
FIG. 6 illustrates a block diagram of an example document publishing system according to an example aspect of the present disclosure.

FIG. 6 illustrates a block diagram of an example document publishing system according to an example aspect of the present disclosure. The system 600 includes a memory 610 and a processor 620 in communication with the memory 610. The memory 610 can store instructions 611 that, when executed by the processor 620, cause the system to perform a variety of processes as described herein. The instructions 611 can be embodied in computer-usable or readable data and include computer-executable instructions, such as in one or more program modules, executed by one or more computing devices as described herein. Program modules can include routines, programs, objects, components, data structures, and the like that perform particular tasks or implement particular abstract data types when executed by a processor. The modules may be written in a programming language that is subsequently compiled or interpreted for execution. Particular data structures may be used to more effectively implement one or more aspects discussed herein, and such data structures are contemplated within the scope of computer executable instructions and computer-usable data described herein.

The processor 610 can obtain source data 630. The source data 630 can be formatted in a standard format as describe herein. The processor 610 can also obtain first target platform data 632 and second platform target data 634. The first target platform data 632 and second platform target data 634 can indicate a target format for data for a first target server system 650 and a second target server system 652 respectively. The target format can include a format for data files, intended content for data files, a directory structure to hold data files, and the like as described herein.

The processor 620 can generate first target data 640. The first target data 640 can be generated based on the first target platform data 632 and the source data 630. For example, in the system 600, the first target data 640 can include a single web page. The processor 620 can generate the second target data 642. The second target data 642 can be generated based on the second target platform data 634 and the source data 630. For example, in the system 600, the second target data 642 can include a plurality of target data files stored in a directory structure. However, it should be noted that the target data for a particular target server system can include any combination of data files, directory structures, index files, and the like as described herein.

The processor 620 can transmit the first target data 640 to a first target server system 650. The first target server system 650 can provide the first target data 640 via a web page 651. For example, a computing device executing a web browser may obtain the web page 651 from the first target server system and render the web page for display to a user of the computing device. The processor 620 can transmit the second target data 642 to a second target server system 652. The second target system 652 may transmit the second target data 652 to a computing device 660, which is executing an application 661. In a variety of examples, the application 661 provides a web service (or any other API) that can be invoked by the second target server system 651 to obtain the second target data 642. The application 661 can provide a notification (e.g. a push notification, notification window, or any other display of data) via the computing device 660. For example, the application 661 can be an IDE used to develop computer software and the notification can be a pop-up that provides contextual information regarding a particular function in the computer software being viewed and/or edited via the IDE.

It will be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, embodiments of the present disclosure should be considered in all respects as illustrative and not restrictive. It will be evident to the annotator skilled in the art to freely combine several or all of the embodiments discussed here as deemed suitable for a specific application of the disclosure. Throughout this disclosure, terms like "advantageous", "exemplary" or "preferred" indicate elements or dimensions which are particularly suitable (but not essential) to the disclosure or an embodiment thereof, and may be modified wherever deemed suitable by the skilled annotator, except where expressly required. Accordingly, the scope of the invention should be determined not by the embodiments illustrated, but by the appended claims and their equivalents.

What is claimed is:

1. A computer-implemented method, comprising:
   obtaining source data, wherein the source data is in a standardized format, the source data including first markup language executable by a computer-implemented browser;
   obtaining target platform data comprising a target platform address and a target format, the target platform data comprising second markup language executable by the computer-implemented browser, wherein the source data is incompatible with the target format;
   generating a directory structure based on the source data and the target format;
   generating, by a conversion system, target data based on the source data and the target format, wherein the target data is in the target format;
   packaging the target data in the directory structure;
   generating deployment instructions based on the target platform data and the packaged data, the deployment instructions configured to cause a target platform to display the target data in the target format; and
   transmitting the packaged data and the deployment instructions to a third-party server system identified by the target platform address.

2. The computer-implemented method of claim 1, wherein transmitting the packaged data and the deployment instructions comprises providing the packaged data and the deployment instructions via an application programming interface indicated by the target platform address.

3. The computer-implemented method of claim 1, further comprising:
generating, based on a second target format and the source data, second target data, wherein the second target data is in the second target format; and
transmitting the second target data to a third-party server system.

4. The computer-implemented method of claim 3, wherein the second target data comprises a single data file.

5. The computer-implemented method of claim 1, wherein:
the target data comprises a plurality of data files; and
each folder in the directory structure comprises at least one data file selected from the plurality of data files.

6. The computer-implemented method of claim 1, further comprising:
generating an index file based on the target data and the directory structure; and
including the index file in the packaged data.

7. The computer-implemented method of claim 1, wherein the deployment instructions cause the third-party server system to:
publish the target data; and
provide the target data to one or more computing devices requesting the target data.

8. A non-transitory computer-readable memory storing instructions that, when executed by at least one processor, are effective to:
obtain source data, wherein the source data is in a computing platform-agnostic standardized format, the source data including first markup language executable by a computer-implemented browser;
obtain target platform data comprising a target format for a plurality of third-party server systems the target platform data comprising second markup language executable by the computer-implemented browser;
generate, by a conversion system, for each third-party server system in the plurality of third-party server systems, target data based on the source data and the target format, wherein the target data is in the target format;
generate deployment instructions based on the target platform data and the target data, the deployment instructions configured to cause a target platform to display the target data in the target format; and
transmit, to each third-party server system in the plurality of third-party server systems, the target data and the deployment instructions corresponding to the third-party server system.

9. The non-transitory computer-readable memory of claim 8, wherein transmitting the target data and the deployment instructions comprises providing the target data and the deployment instructions via an application programming interface indicated by a uniform resource locator associated with the third-party server system.

10. The non-transitory computer-readable memory of claim 8, wherein the target data comprises a single data file.

11. The non-transitory computer-readable memory of claim 8, wherein the target data comprises a plurality of data files.

12. The non-transitory computer-readable memory of claim 8, wherein:
the target data comprises a plurality of data files; and
wherein the non-transitory computer-readable memory stores further instructions that, when executed by the at least one processor, are further effective to:
the generating the target data further comprises generating a directory structure comprising a plurality of folders wherein each folder in the directory structure comprises at least one data file selected from the plurality of data files; and
the transmitting further transmitting the directory structure.

13. The non-transitory computer-readable memory of claim 8 storing further instructions that, when executed by the at least one processor, are further effective to:
generate an index file based on the target platform data for a particular third-party server system in the plurality of third-party server systems; and
transmit the index file to the particular third-party server system.

14. The non-transitory computer-readable memory of claim 8 wherein the deployment instructions cause the third-party server system to:
publish the target data; and
provide the target data to one or more computing devices requesting the target data.

15. An apparatus, comprising:
a processor; and
a memory in communication with the processor and storing instructions that, when executed by the processor, cause the apparatus to:
obtain source data, wherein the source data is in a standardized format, the source data including first markup language executable by a computer-implemented browser;
obtain first target platform data comprising a first target format for a first target server system the first target platform data comprising second markup language executable by the computer-implemented browser, wherein the source data is incompatible with the target format;
obtain second target platform data comprising a second target format for a second target server system;
generate, by a conversion system, first target data based on the source data and the first target format, wherein the first target data is in the first target format;
generate, by the conversion system, second target data based on the source data and the second target format, wherein the second target data is in the second target format;
generate first deployment instructions based on the first target platform data and the first target data,
transmit the first target data and the first deployment instructions to the first target server system, wherein execution of the first deployment instructions by the first server system is configured to cause a target platform to display the first target data via at least one web page; and
transmit the second target data to the second target server system, wherein the second server system is configured to provide the second target data via an application executing on a computing device.

16. The apparatus of claim 15, wherein the instructions, when executed by the processor, further cause the apparatus to:
generate an index file based on the first target platform data; and
transmit the index file to the first target server system.

17. The apparatus of claim 15, wherein the first target data comprises a single data file.

18. The apparatus of claim 15, wherein the first target data comprises a plurality of data files.

19. The apparatus of claim 18, wherein each of the at least web page provided by the first target server system corresponds to at least one data file in the plurality of data files.

20. The apparatus of claim 15, wherein the second target data is provided as a notification displayed within an integrated development environment provided by the application.

* * * * *